Jan. 31, 1956 R. D. KELL 2,733,291

COLOR TELEVISION CAMERA

Filed July 29, 1952 4 Sheets-Sheet 1

INVENTOR.
RAY D. KELL
BY
ATTORNEY

Jan. 31, 1956 R. D. KELL 2,733,291

COLOR TELEVISION CAMERA

Filed July 29, 1952 4 Sheets-Sheet 2

INVENTOR.

RAY D. KELL

BY [signature]

ATTORNEY

Jan. 31, 1956 R. D. KELL 2,733,291

COLOR TELEVISION CAMERA

Filed July 29, 1952 4 Sheets-Sheet 3

INVENTOR.
RAY D. KELL
BY [signature]
ATTORNEY

INVENTOR.
RAY D. KELL
BY [signature]
ATTORNEY

Patented Jan. 31, 1956

2,733,291

COLOR TELEVISION CAMERA

Ray D. Kell, Princeton, N. J., assignor to Radio Corporation of America, a corporation of Delaware Application July 29, 1952, Serial No. 301,503

The terminal fifteen years of the term of the patent to be granted has been disclaimed 16 Claims. (Cl. 178—5.4)

This invention relates to a color television camera that employs a single scanning beam in such manner as to produce simultaneously a plurality of video signals that are useful in various types of color television systems.

The camera is comprised of apparatus for translating light energy falling on a photoelectric surface into electrical signals by means of a scanning device employing a single scanning beam, a special optical system for focusing light from the scene onto the photoelectric surface and circuitry for deriving the desired video signals from the electrical signals produced by the scanning device. These electrical signals lie in three different bands and in describing these signals, the term video will indicate a signal that is directly proportionate to variations in intensity as the scanning proceeds. A first band includes a video signal that may represent the variations in brightness as the scanning proceeds. A second band of frequencies includes a carrier that is amplitude modulated in accordance with the intensity variations of one selected component color, and a third band of frequencies includes a carrier that is amplitude modulated with the intensity variations of another selected component color. The first band of frequencies may be separated from the other bands by a low pass filter and because it is a video brightness signal similar to that derived by standard television cameras, it may be used directly in a color television system in the same way that any brightness signal is employed. However, the video signals representing the intensity variation of the selected component colors do not appear by themselves but as amplitude modulations of different carriers, and therefore it is necessary to provide circuitry to recover them. Various circuits may be used to perform the function, but in one embodiment of the invention the second band of frequencies including the carrier that is amplitude modulated in accordance with the intensity variations of one of the selected component colors is isolated from the other bands of frequencies by a band pass filter and the video signal representing the selected component color is recovered by an amplitude detector. Another band pass filter isolates the third band of frequencies including the carrier that is amplitude modulated by the intensity variations of a different component color, and a video signal representing this color is recovered by another amplitude detector.

Additional circuitry may be provided that combines one or more of the three video signals thus derived so as to produce the type of video signals required by the particular color television transmission apparatus with which the camera is to be used. For example, in one color television transmitter the desired signals are the difference between the brightness video signal and each of two color signals. In the latter, each of the two video color signals that are provided in the manner described above may be subtracted from the brightness signal so as to produce what is known as a color difference signal. In other color transmitters it may be desirable to have three separate video color signals. The third color signal may be derived by subtracting the two video color signals provided by the camera from the brightness signal. Various other ways of combining the video signals supplied by the camera may also be employed.

In previous single beam color cameras, the generated video signals that represent brightness and the various colors all have the same bandwidth. Now it is known that less bandwidth is required for the video signals representing color than for the video signals representing brightness because the eye's acuity for details in color is less than its acuity for details in brightness. In other words the resolution required in color is less than that required for brightness. Therefore in previous single aperture cameras, if the bandwidth allotted to the video brightness signal is such that it can represent the finest details the eye can distinguish in brightness, it follows that the video color signals generated represent much more color detail than the eye can resolve. If the resolution capacity of the camera is such that it can provide signals of this type, the fact that some of the resolution capacity is wasted in generating color video signals representing more color detail than the eye can see may not be objectionable. However, the effective resolution capacity of most cameras is generally not great enough to produce such signals and therefore it is necessary to reduce the bandwidth allotted to the brightness signal and hence to the color signals. This reduces the fineness of detail that can be represented by the brightness signal below the fineness of the detail that the eye can see and accordingly produces a substantial deterioration in an image reproduced from the signals. The bandwidth allotted to the video color signals is also reduced so that the fineness of the detail that can be represented by the color video signals is also reduced.

It is therefore an object of the present invention to provide an improved color camera that makes more efficient use of its resolution capacity so that the video signal representing brightness may represent finer detail.

In some previously suggested camera arrangements, the operation of the scanning aperture may produce brightness and color signals that occupy wide bands and thus represent fine detail in brightness and in color. However, in these arrangements it is often difficult to isolate the various video signals. The problem of isolating the signals is complicated by the fact that harmful beat frequencies may be produced between the various video signals.

It is therefore another object of the invention to generate a video signal representing brightness and video signals representing color that can be easily isolated. This is accomplished in such a way that the video signals represent sufficiently fine detail in brightness and color.

In other single aperture color cameras the aperture may have to be of a particular size and shape and its scanning has to be precisely controlled.

Another aspect of this invention therefore, is to provide an improved color camera employing a single scanning aperture in which wide tolerances may exist in the size and shape of the beam and in the linearity and alignment of the scanning.

Furthermore the filters that analyze the light beam scene into different component colors need not be as complicated in the color camera that is the subject of the present invention as in previous arrangements.

Another advantage of this invention is that light of each selected component color can reach a larger portion of the area of the surface scanned by the scanning device so that the signals produced by the scanning action have a higher signal to noise ratio.

The general manner in which these objectives may be realized will now be explained. Light of one selected component color is directed by optical means to a photoelectric surface of a pickup tube in such manner that the maximum amount that can reach the surface is varied at one uniform rate along each line of the raster scanned by the cathode ray beam of the tube. Light of another selected component color is directed to the photoelectric surface by optical means in such manner that the maximum amount that can reach the surface is varied at a different uniform rate along each line of the raster scanned by the electron beam of the tube. If the light of the two selected component colors is uniformly distributed over the scene, then the scansion of the beam will produce carrier waves of different frequencies but the optical directing means are so arranged that both of the carriers are above the highest video frequency required by the brightness signal. If the light is distributed over the scene in a non-uniform manner, the scansion of the beam will produce two carriers each being amplitude modulated in accordance with the intensity variations of a different selected component color. Thus the optical directing means are light modulation. Because the modulators of the carriers is performed optically, the scanning device should preferably be linear as otherwise the scanning device could produce beats between the various modulation components that are optically produced. Optical low pass filters may be incorporated in the optical system in such way that closely spaced variations in the selected component colors that are too fine for the eye to resolve do not reach the photoelectric surface, and do not produce sidebands of the respective carriers that would waste the resolution capacity of the scanning device.

In addition to the optical means noted above that control the distribution of two selected component colors across the lines of the raster so as to produce modulated carriers when scanned by the beam, another optical means may be provided for imaging light from the scene that is representative of brightness on all portions of the photoelectric surface. As the beam of the pickup tube scans, it produces in response to the light a video signal corresponding to brightness in the same way as in black and white television pickup tubes. It may be desirable to place an optical low pass filter in the third optical path so as to limit the highest frequency of the video signal representing brightness to a value that is below the lowest side band frequency of the nearest carrier.

The provision of the third optical path makes it possible for the light representing brightness to reach the photoelectric surface of the pickup tube without being affected in any way by the optical apparatus directing the two selected component colors to the surface. The bandwidths respectively occupied by the video signals representing the two selected component colors can be controlled by the optical low pass filters inserted in the paths followed by light of these selected component colors, and therefore the bandwidths of the video signals representing the selected component colors may be set at any value independently of the bandwith of the brightness signal.

The invention will be more clearly understood and other objects will become apparent after a consideration of the drawings in which.

Figures 1, 1A:
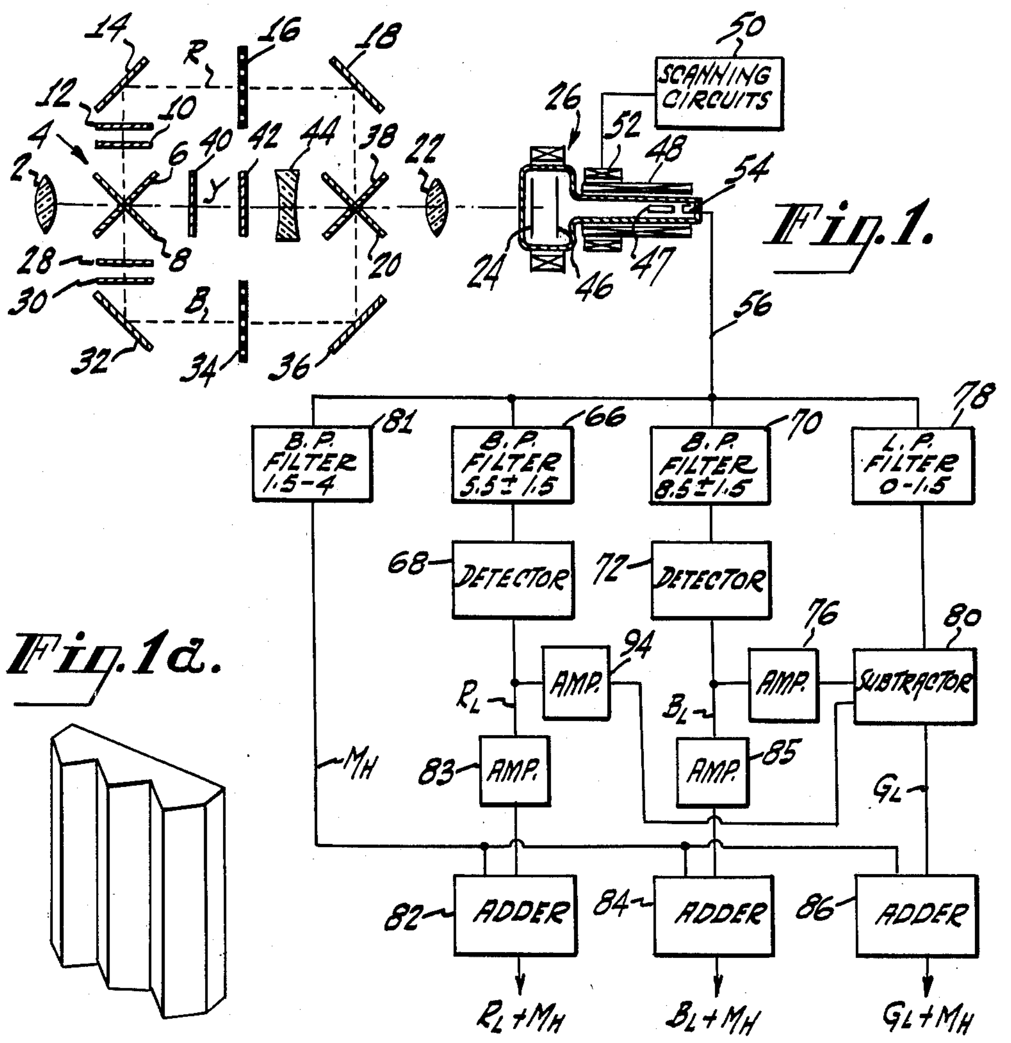
Figure 1 is one embodiment of the invention employing half silvered mirrors to direct light of two selected component colors into two separate optical paths and light representing brightness along a third optical path.
Figure 1A illustrates a type of optical low pass filter that may be used in Figure 1.

In the embodiment of the invention shown in Figure 1 light from the scene passes through an object lens system 2 and is split into three paths by any suitable form of image splitter 4, which in this particular example is indicated as being a pair of crossed partially reflecting mirrors 6 and 8. An optical color selective filter 10 is placed in a first optical path, that followed by light reflected by the mirror 6. The light components selectively passed by filter 10, which may, for example, comprise the red light components of the scene, are then passed through a diffusion plate 12 that serves as an optical low pass filter that cuts off the amount of image detail at any desired fineness and permits larger detail to pass. Figure 1A illustrates one of many different types of diffusion plates that may be used and is comprised of a transparency having one grooved side. Light falling at different points on the faces of the grooves is defocused because the optical paths through the diffusion plates are of different lengths. Therefore any detail in the image falling on the diffusion plate that is commensurate with the size of the grooves is defocused to such a degree that it is substantially lost. Larger areas of the scene cover many grooves and the average light in the area is not altered although the detail within the area may be defocused. It would be possible to use lenses having limited resolving power or frosted or etched diffusion plates but such optical low pass filters reduce the fineness of detail both along the scanning lines and perpendicular to them so as to unnecessarily reduce the color detail in the image. Such devices may be used but it is preferable to employ an optical low pass filter that only limits the fineness of detail along the scanning lines, as the grooved transparency discussed above. The order of the filter 10 and the diffusion plate 12 could be reversed, as it makes no difference whether the component color is selected and then limited so as to represent only relatively large areas or whether all colors are limited to large area representation before the color selection is made.

A mirror 14, that is preferably fully reflecting, directs the red light representing the relatively large areas onto a light modulator 16 that may be in the form of a grating comprised of parallel uniformly spaced striplike areas that do not pass red light. The strip-like areas may be opaque to all colors, or they may be comprised of negative red filter material that subtracts out the red light and passes the other colors. The optical modulator 16 is positioned in the path followed by the red light in a focal plane of the objective lens system 2. An image of the optical modulator 16 is reflected by a mirror 18 onto a partially reflecting mirror 20 and is focused by a relay lens 22 onto suitable single aperture scanning means so that the scanning means can generate electrical signals having a characteristic thereof varied in a predetermined manner with respect to the variation in the intensity of light along the path scanned by the aperture. In the illustrative embodiment of the invention shown in Figure 1 the image of the light modulator is focused on a photoelectric surface 24 of an image orthicon pickup tube 26.

Light passing through the object lens system 2 is also directed along a second optical path by the partially reflecting mirror 8 to a positive optical filter 28 that passes only blue light, for example. The detail represented by the blue light is limited by a diffusion plate 30 that is similar to the diffusion plate 12 in the path followed by the red light. However, it is not necessary that the light passing through the two diffusion plates represent the same fineness of detail. A mirror 32 directs the blue light onto an optical modulator 34 that is placed in a focal plane of the object lens system 2. The optical modulator 34 may be generally similar in construction to the optical modulator 16, but comprised of more closely spaced parallel strips that are opaque to blue light. The strips may be black or negative blue, i. e. opaque to light of all colors or only to blue light. The blue light passing between the opaque parallel strips of the optical modulator 34 is directed by a mirror 36 onto a partially reflecting mirror 38 that may intersect the partially reflecting mirror 20 at such an angle as to direct the blue light onto the relay lens 22. The length of the optical path between the blue light modulator 34 and the relay lens 22 is the same as the length of the optical path between the red light modulator 16 and the relay lens 22 so that the blue light modulator 34 is also imaged on the photoelectric surface 24 of the single aperture scanning device 26.

Some of the light passing through the object lens system passes directly through the crossed partially reflecting mirrors 6 and 8 along a third path that may include an optical low pass filter 40, a "Y" filter 42 and a negative lens 44. For reasons that will subsequently be explained, the optical low pass filter 40 may be omitted, but if used the detail represented by the light passing through the low pass filter 40 is preferably greater than the detail represented by the light passing through either of the diffusion plates 12 or 30.

The "Y" filter may also be omitted if it is desired that the high frequency brightness signals be comprised of equal proportions of each of the selected component colors. If it is desired that the relative amounts of the selected component colors in the fine detail of the brightness signal should be different, a "Y" filter that passes the selected component colors in different relative amounts may be used.

In the optical arrangement illustrated in Figure 1 the three optical paths are substantially in the same plane and the first and second paths that contain the red and blue light are longer than the third path that may pass light of all colors. For this reason the third optical path is effectively lengthened by the insertion of the negative lens 44 so that all three paths have the same optical length. Thus, light in the third path is also focused by the relay lens 22 on to the photoelectric surface of the scanning device 26. It will be apparent to those skilled in the art that the optical paths could be so constructed that all three paths would have the same length, and that under this condition the negative lens 44 could be omitted.

If the scanning device 26 is an image orthicon, the photoelectric surface 24 is normally termed a photocathode and those electrons emitted from the surface in response to any light falling thereon are accelerated to a target 46. A beam of electrons that effectively forms the single aperture is directed toward the target 46 by an electron gun 47 and is focused thereon by a coil 48. Sweep voltage waves of appropriate configuration are supplied by a source 50, and are coupled to a magnetic deflection yoke 52 so as to cause the beam to scan a raster of parallel lines on the target 48. This yoke 52 is so oriented that the parallel lines of the scanned raster intersect the images of the opaque strips of the light modulators 16 and 34. As is well known by those skilled in the art, the D. C. potentials applied to the various electrode structures within the tube are such that the electrons in the beam arrive at the target 46 with substantially zero velocity. A sufficient number of electrons are extracted from the beam to neutralize the charge on the target, and the electrons not extracted are returned to a collector 54, which is generally in the form of an electron multiplier. An output lead 56 is connected to an output terminal of the scanning device 26, and in this particular case is connected to an appropriate stage of the electron multiplier 54.

Figure 2A:
Figure 2 is a graphical illustration of the manner in which the light distribution produced by optical system of Figure 1 produces amplitude modulated carriers when scanned.
Figure 2B:
Figure 2C:

Before proceeding to a description of the circuitry for isolating the various signals appearing at the output terminal of the scanning device and the circuitry for combining these signals let us first examine the manner in which the various signal components are generated by the scanning action of the electron beam. Assume that after passing through the red filter 10 the variation in intensity of red light along a line that is in registry with a line of the raster is as illustrated in Figure 2A. The fine variations in intensity along the line are removed by the optical low pass filter or diffusion plate 12, so that the light distribution along the line represents only the larger areas as illustrated by Figure 2B. It is this light distribution that is directed by the mirror 14 to the light modulation device 16, which will be assumed to be a grating having an appearance from the top as illustrated by Figure 2C. The sections of the grating that are opaque to red light are shaded and in this particular illustration the grating is a 50% grating because the spaces and the opaque strips are of equal width. Gratings that have different percentages of light transmission may be used. Generally it is preferable to use a grating having the highest percentage transmission that does not interfere with the process of isolating the signals representing the intensity variations of the red light.

Figure 2D:

Figure 2D illustrates the relative amplitudes of the portions of the red light that pass through the grating 16 and are focused onto the photocathode 24, and which thus cause development of a corresponding charge pattern on the target 46. The grating in combination with the red filter 10 may be considered as a means for preventing red light from reaching uniformly spaced areas on the scanning device along each line of the raster, or it can be said that this combination is a means for permitting red light to affect only one set of uniformly spaced areas along each line of the raster. If the diffusion plate 17 is added to this combination, a new combination is formed that is a means for permitting only the larger areas or low frequency components of red to reach uniformly spaced areas along each line of the raster.

Figure 1B:
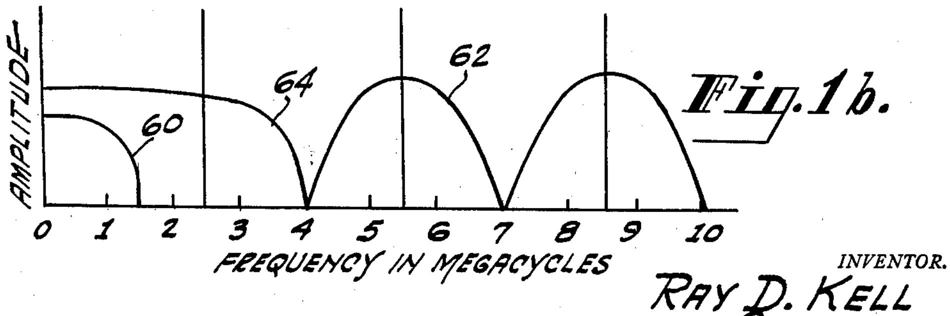
Figure 1B illustrates the frequency bands occupied by the various signals derived by the pickup tube of Figure 1.
Figure 2E:
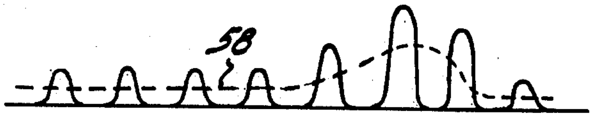
Figure 2F:
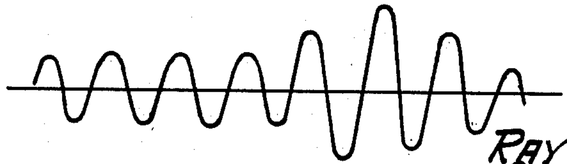

As the electron beam scans across a charge pattern such as illustrated by Figure 2D, a voltage wave illustrated by Figure 2E is produced. As the cross sectional area of the beam may be commensurate with the size of the spaced charged areas along a scanned line, the pulses produced as the beam scans across these charged areas of the target is rounded as indicated. Analysis of the wave of Figure 2E shows that it may be comprised of a low frequency video component that, as indicated by the dotted line 58, corresponds to the distribution of the red light representing large areas along the line of the raster and a carrier of higher frequency that is amplitude modulated in accordance with the same red light. The frequency of the carrier is determined by the rate at which the beam crosses the areas on the target that are in registry either with the opaque areas of the grid 16 or the spaces between them, the rate of crossing either obviously being the same and may, by way of example, be assumed to be a frequency of 5.5 megacycles. The diffusion plate 10 may limit the fineness of detail represented by the red light that reaches the target to such a degree that the scanning action produces a voltage wave in response to the red light variation having a maximum frequency of 1.5 megacycles. Thus the red video signal component has a similar maximum frequency and the sidebands associated with the carrier will lie within 1.5 megacycles on either side of the carrier, as indicated by the lines 60 and 62 respectively of the spectrum distribution chart of Figure 1B.

The second optical path carrying blue light and including the blue light modulator 34 operates in a similar manner and therefore need not be explained in detail. However, it should be noted that there are more opaque areas in a given length of a line of the scanned raster so that the scanning action of the beam produces a carrier having a higher frequency, which, by way of example, may be assumed to be 8.5 megacycles. The diffusion plate 30 in the blue optical path may restrict the fineness of the blue light variation so that the 8.5 megacycle carrier has sidebands representing low frequency variations of the blue light that lie within 1.5 megacycles of the 8.5 megacycle carrier. A blue video signal having a maximum frequency of 1.5 megacycles is also produced.

It should be noted that the red light and the blue light that passes through the respective gratings may strike the same area of the photocathode at various points on a line. However each of the gratings produces a separate carrier that is amplitude modulated in accordance with the color light impinging on the particular grating.

It is apparent that the carriers produced by the gratings have the greatest frequency when the opaque areas of the grating effectively intersect the lines of the raster at 90°, and that the carrier frequencies are reduced as the angle of intersection is changed from 90°.

Light in the third path does not pass through a grating and therefore may strike all areas of the photocathode 24 and thus may charge any part of the target 46 so that the scanning action of the beam produces in response to the light a video signal that varies in amplitude as the light varies in intensity. As previously stated, the insertion of the "Y" filter may control the relative proportion of red, green and blue light in the third optical path. The high video frequencies may have so little energy that they do not interfere substantially with the carriers and their sidebands. If they do interfere they can be eliminated by making the diffusion plate 40 in such a way that it limits the fineness of detail represented by the light passing through it to such a degree that the highest video signal produced in response to this light is, in the above example, 4 megacycles, as indicated by the graph 64 of Figure 1B.

The following description relates to the manner in which the video signals representing the large areas of red, blue and green selected component colors may be separated from the signals that simultaneously appear on the output lead 56 as just described. A band pass filter 66 having its central frequency set at 5.5 megacycles and a bandwith from 4 to 7 megacycles isolates the carrier and the associated sidebands produced by the optical modulator 16 in response to the red light in the first optical path. The low frequency red video signal representing the larger areas of the red portions of the image that control the amplitude variations of the 5.5 megacycle carrier are then extracted by an amplitude modulation detector 68. The 8.5 megacycle carrier and its sidebands are isolated by a band pass filter 70, and the amplitude variations of this carrier that represent the larger areas of the blue portions of the image are detected by an amplitude detector 72 so as to yield the low frequency blue video signals. In the illustrative example, these red and blue video signals may have a maximum frequency of 1.5 megacycles.

A video signal representing the variations in the intensity of green light may be derived by substracting suitable proportions of the read and blue video signals below 1.5 megacycles, that were derived from the 5.5 and 8.5 megacycle carriers by the detectors 68 and 72, from the video signals below 4.0 megacycles appearing at the output lead 56. In this explanation it will be assumed that the "Y" filter is not inserted in the third optical part so that red, green and blue light in this path are of equal proportions. It will also be assumed that the average amount of red light and blue light that produces video signals below 1.5 megacycles after passing through the gratings in the first and second optical paths is 50% of the average intensities of the corresponding components of red and blue that pass through the third optical path. The scanning action of the beam simultaneously produces video signals below 1.5 megacycles that are derived from light in each of the three optical paths. It should be borne in mind that these video signals are all added together and not separate. A first red video signal is derived from the red light passing through the grating in the first optical path. On the basis of the assumption made above, a second red video signal having twice as much amplitude as the first is derived from the red light in the third optical path. Except for the 2 to 1 ratio in amplitude the red video signals are identical as they both represent the variation of red light in large areas. A first blue video signal is derived from the blue light passing through the grating in the second or blue optical path. On the basis of the assumptions made above, a second blue video signal having twice as much amplitude as the first is derived from the blue light in the third optical path. A green video signal is derived only from the green light in the third optical path. In addition to the video signals that lie below 1.5 megacycles the scanning action of the beam produces a response to light in the third optical path video signals for each of the colors that may extend beyond 1.5 megacycles. In addition to these video signals the scanning action of the beam derives, as has been previously explained, a 5.5 megacycle carrier that is amplitude modulated in accordance with the red light passing the grating in the first optical path, and an 8.5 megacycle carrier that is amplitude modulated in accordance with the blue light passing the grating in the second optical path. It will be assumed the red video signal recovered by the detector 68 is identical in every respect to the first red video signal noted above and that the blue video signal recovered by the detector 72 is identical to the first blue video signal noted above. This is understandable as the same light that passes through the gratings produces the amplitude variations of the carriers as well as the first video signals. Therefore, if the red and blue video signals appearing at the outputs of the detectors 68 and 72 are tripled in amplitude by amplifiers 74 and 76 respectively, they will have the same amplitude as the respective sums of the first and second red and blue video signals derived directly from the scanning that lie below 1.5 megacycles. A low pass filter 78 selects all video frequencies below 1.5 megacycles that are derived directly from the scanning action. A subtractor 80 is coupled to the output of the low pass filter 78 and the amplifiers 74 and 76 in any known manner so as to subtract the red and blue video signals appearing at the output of the amplifiers from the output of the low pass filter 78. As the red and blue video signals supplied by the amplifier are identical to the red and blue components at the output of the low pass filter they cancel each other so as to leave only a green video signal that is below 1.5 megacycles. This low frequency green video signal has twice the amplitude range of the low frequency red and blue video signals, and therefore the red and blue video signals are doubled in amplitude by amplifiers 83 and 85.

A band pass filter 81, that in this particular example passes frequencies between 1.5 and 4.0 megacycles, selects the video frequencies produced by the scanning action of the beams in response to the light in the third optical path that represents the fine detail of all three colors. The output of this band pass filter is therefore what has been called a mixed high signal. No provision is made for isolating the high frequency portions of the colors that are components of this mixed high signal as they represent color detail that is generally too fine for the eye to distinguish.

The description above was predicated on the assumption that a "Y" filter was not used and accordingly equal proportions of red, green and blue followed the third optical path. However, since the mixed high signal supplied by the band pass filter 80 represents brightness and not color, it may be preferable to insert a "Y" filter so as to make the brightness signals more closely represent the apparent brightness of the scene being televised. If the response of the color camera to the fine detail in each color were the same, then details in the different colors that emitted the same amount of light energy would contribute equally to the mixed high brightness signal and therefore would appear in the final image that is created in response to the signals generated by the camera as black and white detail of equal intensity, it being remembered that there is no color segregation at these mixed high frequencies. However in observing this same detail in the scene the eye's characteristics are such that the green detail would appear brighter than the red detail and the red detail would appear much brighter than the blue detail even though the eye would not distinguish between the colors. Consequently a reproduction of all the differently colored detail at the same intensity would not conform to the apparent brightness of the scene as observed by the eye. Therefore, it may be advantageous to insert a "Y" filter in the third optical path so as to attenuate the red and blue light so that the filter characteristics are similar to those of the eye. When this is done, the contribution of the red light and the blue light to the signal appearing at the output of the low pass filter 78 is greatly reduced so that the red and blue video signals supplied by the amplifiers 74 and 76 to the subtractor 80 should be reduced by the same amount but not in the same proportion. Accordingly, the gain of the amplifiers may be made less than three to one.

It was also assumed in the discussion above that the red light representing large areas and passing the respective gratings was 50% of the red and blue light representing the same large areas in the third optical path. It will be apparent to one skilled in the art that other relationships between the light energies in the different paths might occur depending on the transmission efficiencies of the various optical components in these paths. However, this would merely require that the gain of the amplifiers 74 and 76 be adjusted so that their outputs would have the same amplitude as the sum of all low frequency red and blue video signals derived directly from the scanning action and appearing at the output of the low pass filter 78.

Figure 1C:
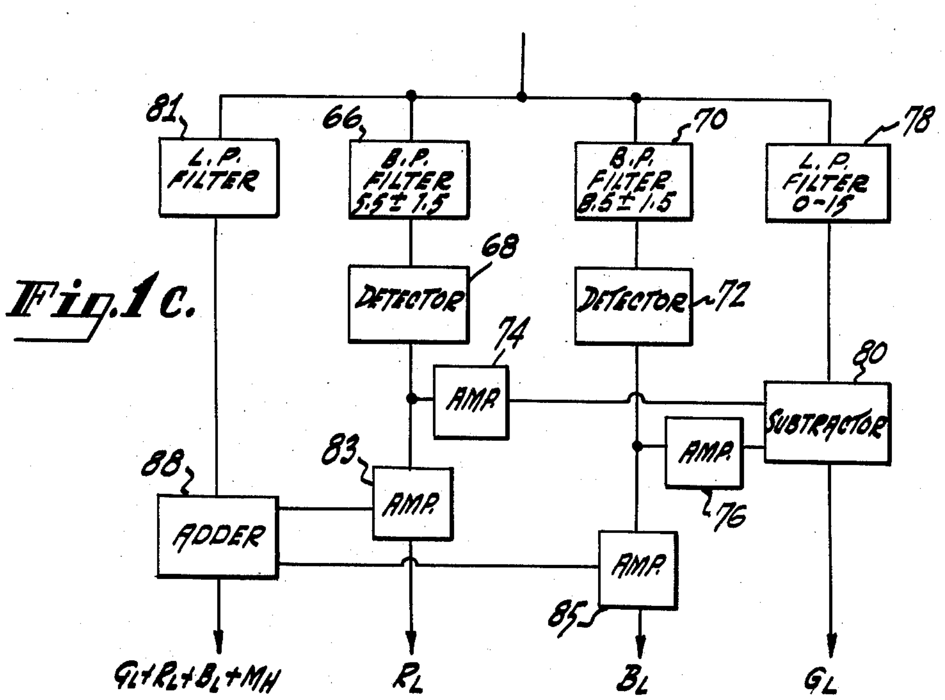
Figure 1C illustrates another circuit for combining the signals supplied by the pickup tube of Figure 1.

The following discussion relates to circuitry whereby the mixed high signal and the low frequency color signals may be combined so as to form other signals that are directly useable in various types of color transmission systems. If a color system is employed that requires each low frequency color signal in combination with the mixed high signal, the mixed high signal appearing at the output of the band pass filter 81 can be added to each of the low frequency color signals appearing at the outputs of the amplifiers 83 and 85 and the subtractor 80, as by adders 82, 84 and 86 connected as shown in Figure 1. If on the other hand the transmission system requires a brightness signal including all the low frequency color signals and a mixed high signal, as well as separate low frequency color signals, an arrangement such as illustrated in Figure 1C may be used, wherein the mixed high signals and all of the low frequency color signals are combined in an adder 88. The gains of the various amplifiers that couple the signals to the adder are set so that the various signals are in the ratios observed in the original scene.

Figures 3, 4, 4A, 4B, 4C, 4D, 4E, 4F:
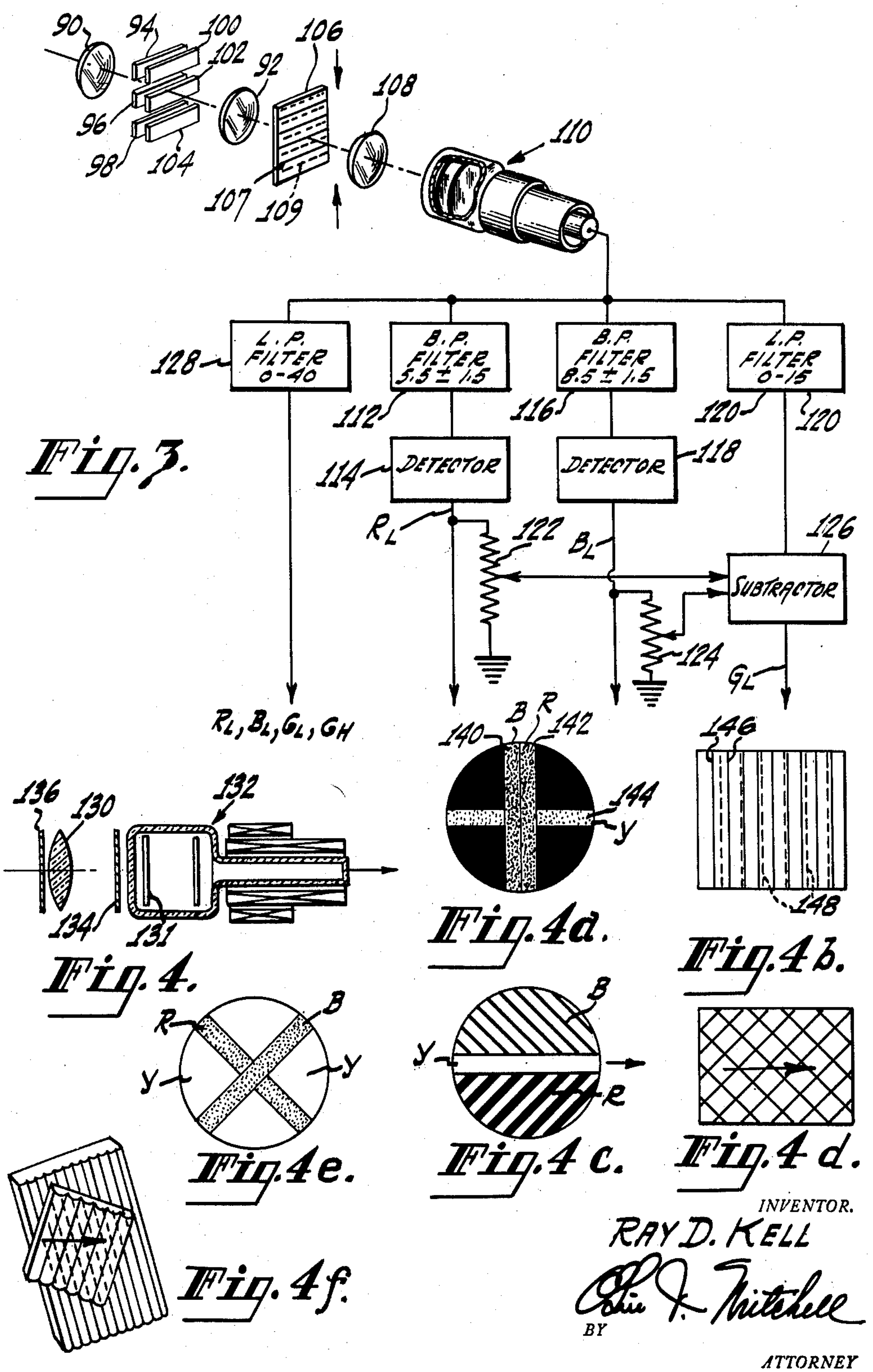
Figure 3 illustrates another embodiment of the invention that utilizes an optical system employing a relay lens.
Figure 4 illustrates a general arrangement of the invention wherein the optical means for directing the selected component colors of light to the photoelectric surface is mounted close to the surface so as to avoid the use of a relay lens.
Figures 4A, 4B, 4C, 4D, 4E and 4F illustrate various optical components that may be employed in the general arrangement of Figure 4.

Figure 3 illustrates another color camera constructed in accordance with the principles of this invention so as to derive signals similar to those derived in the camera of Figure 1. In this camera an objective lens system is comprised of lenses 90 and 92. Positive optical filter strips 94, 96 and 98 that transmit red, green and blue light respectively are mounted in registry with diffusion plates or optical low pass filters 100, 102 and 104. The diffusion plates 100 and 104 that are in registry with the red and blue filter strips respectively may be such that the finest detail represented by the light passed by them is such as to produce a video signal 1.5 megacycles at the scanning frequencies to be used. The diffusion plate 102 that is in registry with the green filter strip may be omitted if the light energy in fine detail is so low as not to interfere with the carriers that are modulated in accordance with red and blue light. However, if it is used, it may be designed to limit the green detail to a fineness commensurate with 4.0 megacycles. These color filters and their associated diffusion plates or optical low pass filters may be inserted between the optical lenses 90 and 92 as shown or they may be mounted on the remote side of either of the lenses. The color filters may be rotated about the principal axis of the lens system to any desired position. A light modulator 106 is mounted in a focal plane of the object lens system and may include first grid comprised of equally spaced parallel strips, indicated by the solid lines 107, that are optically negative to red light, and a second set of equally spaced parallel strips, indicated by the dotted lines 109, that are optically negative to blue light. Thus, one set of strips passes green and blue light and is opaque to red, and the other set of strips passes green and red light but is opaque to blue. The sets of strips need not be parallel to one another and may be oriented in random fashion about the optical axis. A relay lens 108 focuses an image of the gratings and the light passing through them onto a scanning device 110 that may be the same as the scanning device 26 of Figure 1. The negative red strips prevent red light from impinging on the scanning device at a first set of points along each line of the raster, and the negative blue strips prevent blue light from reaching a differently spaced set of points along each line of the raster, so that the sets of strips function in much the same manner as the optical modulators or grids 16 and 34 of Figure 1. However, the green light passes through all areas of the grid 106 and hence strike all areas of the scanning device 110. The scanning action produces a 5.5 megacycle carrier that is amplitude modulated with low frequency variations of red light up to 1.5 megacycles and an 8.5 megacycle carrier that is similarly modulated with blue light. In addition to these modulated carriers the scanning action produces video signals having three components. A first component is a red video signal that lies below 1.5 megacycles, a second component is a blue video signal that lies below 1.5 megacycles, and the third component is a green video signal, representing all frequencies of green if the diffusion plate 102 is not used, and from 0 to 4.0 megacycles if the diffusion plate 102 is used.

A band pass filter 112 selects the 5.5 megacycle carrier and its sidebands, and an amplitude detector 114 recovers the red video signal carried by the sidebands. In a similar manner, a band pass filter 116 and an amplitude detector 118 operate to recover the blue video signal carried by the sidebands of the 8.5 megacycle carrier. A low pass filter 120 having a cut off frequency of 1.5 megacycles selects the combined low frequency video signals representing red, blue and green. Potentiometers 122 and 124 are coupled to the outputs of the detectors 114 and 118 respectively and are adjusted so that the red and blue video signals recovered from the carrier are equal to the corresponding red and blue video components appearing in the output of the low pass filter 120. A subtractor 126 serves to subtract the red and blue video components provided by the potentiometers from the output of the low pass filter 120 so as to yield a green video signal having a maximum frequency of 1.5 megacycles. It can be seen that the recovery of the low frequency green video signal is done in a way that is similar to that used in Figure 1. However, potentiometers are used to couple the outputs of the detectors to the subtractor instead of amplifiers because these red and blue video signals are generally the same amplitude as the corresponding components in the video signals passed by the low pass filter 120. In the arrangement of Figure 1 the red and blue video signal components appearing at the output of the low pass filter 78 were derived from the red and blue light in the third optical path that contained no gratings as well as the red and blue light that passed the gratings in the first and second optical paths. In the arrangement of Figure 3, the red and blue components of the video signals passed by the low pass filter 120 are derived only from the light passing through the negative red and negative blue gratings. This same light produces the amplitude modulation of the respective carriers and therefore the signals derived by detecting the carriers is generally the same amplitude as the video signal recovered directly from the scanning action.

A brightness signal having low frequencies of each color and the high frequencies of green may be derived by a low pass filter 123 having a cut off frequency of 4.0 megacycles.

Figure 4 illustrates another camera arrangement embodying the principles of this invention whereby relay lenses such as 22 of Figure 1 and 103 of Figure 3 may be eliminated. An objective lens 130 focuses the light from the scene onto a photocathode 131 of an image orthicon 132. An optical light modulator or grating 134 having negative color strips is mounted close to the photocathode and may be either inside or outside the tube, and a lens cap 136 that is comprised of positive color filters and appropriate diffusion plates is mounted in front of the lens 130. The positive color filters of the lens cap are generally in the form of strips that are parallel to the negative color strips in the grating 134, and cause the image of the gratings as well as the light passing through the grating to be focused at the photocathode 131.

Various combinations of lens caps and gratings that permit light of a first selected component color to impinge on areas having one uniform spacing along each line of the raster, and light of another selected component color to impinge on areas having a different uniform spacing along each line of the raster, and light of at least one component color to impinge on all areas of the raster, will now be described.

Figure 4A illustrates a front view of a lens cap having vertical strip 140 that passes only blue light and another vertical strip 142 that passes only red light. A horizontal strip 144 may be a "Y" filter such as the filter 40 of Figure 1 or it may be equally transparent to all colors. The fineness of the detail in blue and red may be controlled by diffusion plates that are mounted in registry with the blue and red filter strips. In this front view of the lens cap, the diffusion plates are indicated by the shading on the filter strips. The use of the diffusion plate indicated by the shading on the horizontal strip 144 is optional, for reasons that were discussed in connection with the use of the diffusion plate 40 of Figure 1. The portions of the lens cap outside of the strips are opaque to light. Figure 4B illustrates a grating similar to the grating 106 of Figure 3 and comprised of negative blue vertical strips 146 (indicated by solid lines) that have a spacing such as to produce an 8.5 megacycle signal at the normal scanning speeds of the image orthicon that in this illustration is used as a scanning device. The vertical dotted lines indicate negative red strips 148 that are more widely spaced so as to produce a frequency of 5.5 megacycles.

Figure 5:
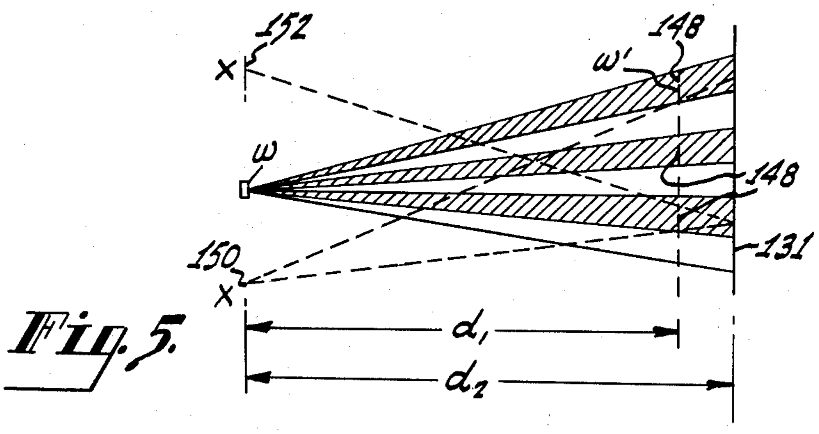
Figure 5 is a diagram illustrating the operation of the optical components that may be used in the arrangement of Figures 4A and 4B.

Figure 5 illustrates the manner in which the blue and red strips of the lens cap may focus the grating of negative color strips on the photocathode. In order to simplify the explanation, let us examine how the blue strip 140 on the lens cap may focus the negative blue strips 148 of the grating on the photocathode. The negative red strips 146 will be focused in the same manner, and neither operation interferes with the other, so that it is valid to consider them separately. Figure 5 is an end view of the positive blue strip 140 that forms part of the lens cap and the negative blue strips 148 that form part of the grating. In Figure 4A the width of the various strips has been exaggerated in order that the drawing may be clearer, but in an actual embodiment these strips are generally much narrower as indicated in Figure 5. The negative blue filter strips 148 prevent the blue light from reaching the photocathode 131 in the shaded sections. If the positive blue strip 140 were much wider, the blue light would pass through the spaces between the negative strips 148 and impinge on the shaded portion of the photocathode. As a general approximation it can be said that focusing of the negative grid on the photocathode occurs when the various dimensions illustrated on the drawing are proportioned as indicated.

That light passing through the horizontad strip 144 does not focus the negative blue strips 148 on the photocathode is illustrated by the dotted lines of Figure 5 which show that light approaching the negative blue strips 148 from points 150 and 152 can land on the shaded areas of the photocathode. Then too, any red and green light passing through the horizontal strip 144 of the lens cap of Figure 4A is not blocked by the negative blue strips 148 in the grid 134.

Red light passing through the vertical red positive filter 142 in the lens cap is not blocked by the negative blue strips 148 so that it does not focus them at the photocathode. However, the red light does focus the negative red strips 146 on the photocathode.

Figure 4C illustrates another form of lens cap and negative color grid that may be employed to produce a similar light pattern on the photocathode. The color grating may be comprised of negative red strips that are indicated by the relatively wider spaced lines running from the lower left to the upper right and of negative blue strips that are more closely spaced running at right angles to the negative red strips or from the lower right to the upper left. The scanning proceeds in a series of spaced parallel lines that are parallel to the arrow. The center of the lens cap may be transparent or it may be a "Y" filter. The upper portion of the lens cap is comprised of positive blue strips that are parallel to the negative blue strips on the grid. The lower portion of the lens cap is comprised of positive red strips that are parallel to the negative red strips in the grid. The spacing between the positive blue strips of the lens cap is such that light passing through each of them focuses the negative blue strips of the grid at the same position on the photocathode. The spacing between the positive red strips of the lens cap is such as to focus each of the negative red strips of the grid at the same position on the photocathode. The use of a plurality of strips then adds to the light efficiency as they act like a plurality of apertures.

Figure 6:
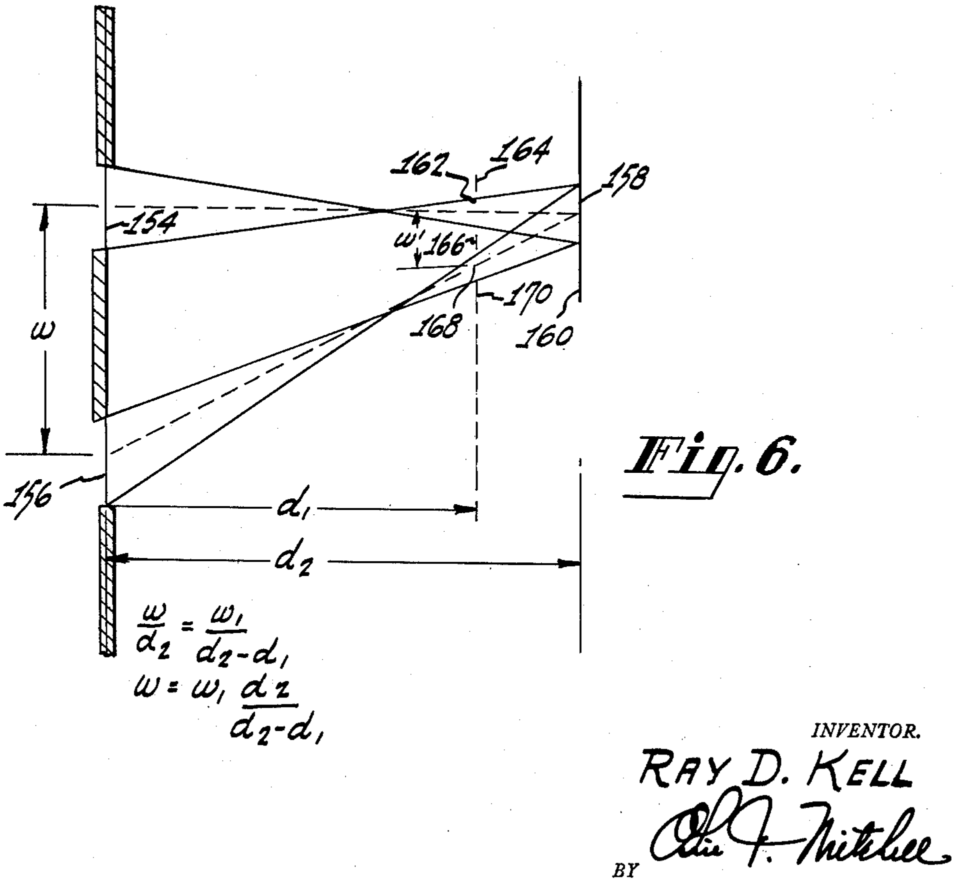
Figure 6 is a diagram illustrating the operation of the optical components of Figures 4C and 4D.

In order to understand how light passing through two positive color filter strips may focus the corresponding negative grid at the same position, reference is made to Figure 6. Assume that two positive color strips 154 and 156 are spaced as shown. Light passing through the positive strip 154 follows a path between the solid lines that passes to an area 158 on the photocathode 160 through a space 162 that lies between negative strips 164 and 166. Light of the same color passes through the positive strip 156 and follows a path between the dotted lines to the same area 158 on the photocathode. However, this latter light path passes through a space 168 that lies between the negative strip 166 and a negative strip 170. If the positive strips 154 and 156 are not positioned in the manner shown, the negative grating would be imaged at different positions. As the positive strips 154 and 156 are separated further and further apart or moved closer and closer together, the images of the negative grating on the photocathode 160 may move from a superimposed position, as shown, to an intermeshed position, and back again to a superimposed position. The orientation of the different negative grids with respect to the scanning direction as shown in Figure 4D decreases any moire effects that might otherwise be produced. Suitable diffusion plates have not been shown, but it will be understood that they can be mounted in registry with the corresponding positive filters on the lens cap so as to control the fineness of detail represented by the different colors. As in the other arrangements, the light passing through the transparent strip, or "Y" filter, as the case may be, does not focus either of the color grids at the photocathode and, accordingly, may strike any area of the photocathode.

Figures 4E and 4F illustrate another combination of lens cap and color grid that can be used to produce the same type of light pattern on the photoelectric surface of the scanning device. The circuits for recovering the various signals may be similar to those previously described, and their description therefore shall not be repeated. The lens cap is comprised of narrow positive red and blue strip filters that intersect at right angles at the center of the cap. The sectors between the strip are transparent or may have a "Y" filter. Diffusion plates may be used if desired. The color grid, as shown in Figure 4F, is comprised of two lenticulated surfaces, one being mounted so that the lenticulations are parallel to the positive red strip, and the other being mounted so that the lenticulations are parallel to the positive blue strips. As is well known, each lenticule focuses the light impinging on it at a line that is parallel to it so that the lenticules effectively form a grating. The photocathode is placed in a focal plane of the lenticules so that scansion of the beam in the direction of the arrow produces modulated carrier signals corresponding to those derived by the camera of Figure 1. Light passing through the areas of the lens cap labeled with a "Y" does not focus either lenticulated grating at the photocathode and therefore the scansion of the beam produces video signals corresponding to those derived by the apparatus of Figure 1.

Having thus described the invention, what is claimed is:

1. A color television camera comprising in combination an image scanning device; means for focusing a discontinuous image of a scene to be televised in a first selected component color upon said device, the discontinuities of said first selected component color image being regularly distributed along a dimension of said focused image with a predetermined period of recurrence; means for focusing a discontinuous image of said scene in a second selected component color upon said device, the discontinuities of said second selected component color image also being regularly distributed along a dimension of said latter focused recurrence; means for deriving electrical output signals from said image but with a different period of recurrence than said predetermined period of image scanning device in response to the scanning by said device of the images focused thereon, said output signals including respective frequency distinctive components representative of said first and second selected component color images, respectively; and frequency selective means coupled to said signal deriving means and responsive to said output signals for obtaining therefrom a pair of signals respectively representative of said scene in said first and second selected component colors; said first-named discontinuous image focusing means including a first light path for light from said scene, color selective optical means for restricting the light in said first path to light of said first selected component color, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, and a second optical grating disposed in said second light path and comprising a plurality of regularly distributed elements opaque to said second selected component color.

2. A color television camera comprising in combination an image scanning device; means for focusing a discontinuous image of a scene to be televised in a first selected component color upon said device, the discontinuities of said first selected component color image being regularly distributed along a dimension of said focused image with a predetermined period of recurence; means for focusing a discontinuous image of said scene in a second selected component color upon said device, the discontinuities of said second selected component color image also being regularly distributed along a dimension of said latter focused image but with a different period of recurrence than said predetermined period of recurrence; means for deriving electrical output signals from said image scanning device in response to the scanning by said device of the images focused thereon, said output signals including respective frequency distinctive components representative of said first and second selected component color images, respectively; and frequency selective means coupled to said signal deriving means and responsive to said output signals for obtaining therefrom a pair of signals respectively representative of said scene in said first and second selected component colors; said first-named discontinuous image focusing means including a first light path for light from said scene, color selective optical means for restricting the light in said first path to light of said first selected component color, an optical low pass filter disposed in said first light path for restricting the detail of the discontinuous image in said first selected component color focused upon said device, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, an optical low pass filter disposed in said second light path for restricting the detail of the discontinuous image in said second selected component color focused upon said device, and a second optical grating disposed in said second light path and comprising a plurality of regularly distributed elements opaque to said second selected component color.

3. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors.

4. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors; said first-named discontinuous image focusing means including a first light path for light from said scene, color selective optical means for restricting the light in said first path to light of said first selected component color, and a first optical grating disposed in said first light path and comprising a plurality of regularly distributed elements opaque to said first selected component color; and said second-named discontinuous image focusing means comprising a second light path for light from said scene, additional color selective optical means for restricting the light in said second light path to light of said second selected component color, and a second optical grating disposed in said second light path and comprising a plurality of regularly distributed elements opaque to said second selected component color.

5. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors; said first-named discontinuous image focusing means including a first light path for light from said scene, color selective optical means for restricting the light in said first path to light of said first selected component color, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, and a second optical grating disposed in said second light path and comprising a plurality of regularly distributed elements opaque to said second selected component color; and said continuous image focusing means including a third light path for light from said scene, and further color selective optical means for restricting the light in said third light path to light of a third selected component color.

6. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors; said first-named discontinuous image focusing means including a first light path for light from said scene, color selective optical means for restricting the light in said first path to light of said first selected component color, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, and a second optical grating disposed in said second light path and comprising a plurality of regularly distributed elements opaque to said second selected component color; and said continuous image focusing means including a third light path for light from said scene, said third light path being adapted to pass light of all colors.

7. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors; said first-named discontinuous image focusing means including a first light path for light from said scene, color selective optical means for restricting the light in said first path to light of said first selected component color, an optical low pass filter disposed in said first light path for restricting the detail of the discontinuous image in said first selected component color focused upon said device, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, an optical low pass filter disposed in said second light path for restricting the detail of the discontinuous image in said second selected component color focused upon said device, and a second optical grating disposed in said second light path and comprising a plurality of regularly distributed elements opaque to said second selected component color; and said continuous image focusing means including a third light path for light from said scene, said third light path being adapted to pass light of all colors.

8. A color television camera comprising in combination an image scanning device; means for focusing a discontinuous image of a scene to be televised in a first component color upon said device, the discontinuities of said first selected component color image being regularly distributed across said focused image with a predetermined period of recurrence; means for focusing a discontinuous image of said scene in a second selected component color upon said device, the discontinuities of said second selected component color image also being regularly distributed across said latter focused image but with a different period of recurrence than said predetermined period of recurrence; means for focusing a continuous image of said scene upon said device; means for deriving electrical output signals from said image scanning device in response to the scanning by said device of the images focused thereon, said output signals including video frequency components representative of said continuous image and respective frequency distinctive components representative of said first and second selected component color images; and frequency selective means coupled to said signal deriving means and responsive to said output signals for obtaining therefrom said video frequency signals and a pair of signals respectively representative of said image in said first and second selected component colors; said first-named discontinuous image focusing means including a first light path for light from said scene, color selective optical means for restricting the light in said first path to light of said first selected component color, an optical low pass filter disposed in said first light path for restricting the detail of the discontinuous image in said first selected component color focused upon said device, and a first optical grating disposed in said first light path and comprising a plurality of regularly distributed elements opaque to said first selected component color; said second-named discontinuous image focusing means comprising a second light path for light from said scene, additional color selective optical means for restricting the light in said second light path to light of said second selected component color, an optical low pass filter disposed in said second light path for restricting the detail of the discontinuous image in said second selected component color focused upon said device, and a second optical grating disposed in said second light path and comprising a plurality of regularly distributed elements opaque to said second selected component color; and said continuous image focusing means including a third light path for light from said scene, said third light path being adapted to pass light of all colors, and a third optical low pass filter disposed in said third light path for restricting the detail of the continuous image of said scene focused upon said device.

9. A color television camera comprising in combination an image scanning device; means for focusing a discontinuous image of a scene to be televised in a first selected component color upon said device, the discontinuities of said first selected component color image being regularly distributed along a dimension of said focused image with a predetermined period of recurrence; means for focusing a discontinuous image of said scene in a second selected component color upon said device, the discontinuities of said second selected component color image also being regularly distributed along a dimension of said latter focused image but with a different period of recurrence than said predetermined period of recurrence; means for deriving electrical output signals from said image scanning device in response to the scanning by said device of the images focused thereon, said output signals including respective frequency distinctive components representative of said first and second selected component color images, respectively; and frequency selective means coupled to said signal deriving means and responsive to said output signals for obtaining therefrom a pair of signals respectively representative of said scene in said first and second selected component colors; the respective frequency distinctive components included in the output signals derived from said image scanning device comprising respective modulated carriers, the frequency of one of said carriers being determined by the rate of scanning by said device of the discontinuities of said predetermined period of recurrence in said first selected component color image, the frequency of another of said carriers being determined by the rate of scanning by said device of the discontinuities of said different period of recurrence in said second selected component color image; said frequency selective means comprising a pair of bandpass filters, the passband of one of said pair of bandpass filters being centered about the frequency of said one carrier, and the passband of the other of said pair of bandpass filters being centered about the frequency of said other carrier.

10. A color television camera comprising in combination an image scanning device; means for focusing a discontinuous image of a scene to be televised in a first selected component color upon said device, the discontinuities of said first selected component color image being regularly distributed along a dimension of said focused image with a predetermined period of recurrence; means for focusing a discontinuous image of said scene in a second selected component color upon said device, the discontinuities of said second selected component color image also being regularly distributed along a dimension of said latter focused image but with a different period of recurrence than said predetermined period of recurrence; means for deriving electrical output signals from said image scanning device in response to the scanning by said device of the images focused thereon, said output signals including respective frequency distinctive components representative of said first and second selected component color images, respectively; and frequency selective means coupled to said signal deriving means and responsive to said output signals for obtaining therefrom a pair of signals respectively representative of said scene in said first and second selected component colors; the respective frequency distinctive components included in the output signals derived from said image scanning device comprising respective modulated carriers, the frequency of one of said carriers being determined by the rate of scanning by said device of the discontinuities of said predetermined period of recurrence in said first selected component color image, the frequency of another of said carriers being determined by the rate of scanning by said device of the discontinuities of said different period of recurrence in said second selected component color image; said frequency selective means comprising a pair of bandpass filters, the passband of one of said pair of bandpass filters being centered about the frequency of said one carrier, and the passband of the other of said pair of bandpass filters being centered about the frequency of said other carrier, and respective amplitude detectors coupled to said respective bandpass filters.

11. A color television camera comprising in combination an image scanning device; means for focusing a discontinuous image of a scene to be televised in a first selected component color upon said device, the discontinuities of said first selected component color image being regularly distributed along a dimension of said focused image with a predetermined period of recurrence; means for focusing a discontinuous image of said scene in a second selected component color upon said device, the discontinuities of said second selected component color image also being regularly distributed along a dimension of said latter focused image but with a different period of recurrence than said predetermined period of recurrence; means for deriving electrical output signals from said image scanning device in response to the scanning by said device of the images focused thereon, said output signals including respective frequency distinctive components representative of said first and second selected component color images, respectively; and frequency selective means coupled to said signal deriving means and responsive to said output signals for obtaining therefrom a pair of signals respectively representative of said scene in said first and second selected component colors.

12. A color television camera in accordance with claim 11 including an objective lens system disposed to receive light from said scene, a first optical strip filter that only passes light of said first selected component color, a second optical strip filter that only passes light of said second selected component color, said optical filters being mounted so as to control the hue of the light emerging from respectively different portions of said objective lens system, a grating comprising a first set of uniformly spaced strips that are optically negative to said first selected component color and a second set of strips that are optically negative to said second selected component color, the first and second sets of strips having respectively different spacings, said grating being mounted in a focal plane of objective lens system, and a relay lens mounted so as to focus the image of said grating upon said image scanning device; and wherein said first-named discontinuous image focusing means includes said objective lens system, said first optical strip filter, said grating and said relay lens; and wherein said second-named discontinuous image focusing means includes said objective lens system, said second optical strip filter, said grating and said relay lens.

13. A color television camera in accordance with claim 11 including an objective lens disposed to receive light from said scene, a lens cap mounted in the same light path as said lens, said lens cap comprising a first optical filter strip that selectively transmits light of said first selected component color, a second optical filter strip that is parallel and adjacent to the first and selectively transmits light of said second selected component color, and a third optical filter strip adapted to pass light of all component colors, said third filter strip being disposed at an angle with respect to said first and second strips, a grating mounted so as to receive light passing through said lens cap and said objective lens, said grating comprising a first group of optical filter strips that are parallel to the first optical filter strip of said lens cap and that attenuate light of said first selected component color, and a second group of optical filter strips that are parallel to the second optical filter strip of said lens cap and that attenuate light of said second selected component color, the respective inter-strip spacings of the strips in the two groups being different; and wherein said first-named discontinuuous image focusing means includes said objective lens, said first optical filter strip of said lens cap, and said first group of optical filter strips of said grating; and wherein said second-named discontinuous image focusing means includes said objective lens, said second optical filter strip of said lens cap, and said second group of optical filter strips of said grating.

14. A color television camera in accordance with claim 13 including means for focusing a continuous image of said scene upon said device, said last-named means including said objective lens, and said third filter strip of said lens cap.

15. A color television camera in accordance with claim 11 including an objective lens disposed to receive light from said scene, a lens cap mounted in the same light path as said objective lens, said lens cap comprising a first optical filter strip that selectively transmits light of said first selected component color, a second optical filter strip that selectively transmits light of said second selected component color, said filter strips being angularly disposed relative to one another and the remaining area of said lens cap being adapted to transmit light from said scene of a plurality of component colors, a grid mounted so as to receive light passing through said lens and said lens cap, said grid comprising a first lenticulated surface mounted such that the lenticules thereof are parallel to said first optical filter strip and a second lenticulated surface mounted such that the lenticules thereof are parallel to said second optical filter strip; and wherein said first-named discontinuous image focusing means includes said objective lens, said first optical filter strip of said lens cap, and said first lenticulated surface of said grid; and wherein said second-named discontinuous image focusing means includes said objective lens, said second optical filter strip of said lens cap, and said second lenticulated surface of said grid.

16. A color television camera in accordance with claim 15 including means for focusing a continuous image of said scene upon said device, said last-named means including said remaining lens cap area.

References Cited in the file of this patent

UNITED STATES PATENTS

| | | |
|---|---|---|
| 2,552,070 | Sziklai | May 8, 1951 |
| 2,566,707 | Sziklai | Sept. 4, 1951 |
| 2,586,482 | Rose | Feb. 19, 1952 |